3,524,167

MAGNETIC MEMORY SWITCH AND ARRAY

Albert Regnier, Issy-les-Moulineaux, and Fernand Silerme, Creteil, France, assignors to International Standard Electric Corporation, New York, N.Y., a corporation of Delaware Filed Jan. 4, 1965, Ser. No. 423,226
Claims priority, application France, Jan. 7, 1964, 959,566
Int. Cl. H01h 47/00; H04q 9/00
U.S. Cl. 340—166 7 Claims

ABSTRACT OF THE DISCLOSURE

A plurality of magnetic core and glass reed contact crosspoint structures are arranged in rows and columns. Equal and opposite flux producing windings on adjacent crosspoint structures are serially and orthogonally coupled together to define such rows and columns. A long and a short pulse are simultaneously applied to the windings of a selected row and column. While the short pulse persists, the cores are magnetized to a remanent condition which causes the contacts to assume an unoperated condition. After the short pulse ends and while the long pulse persists, core flux is driven so that the flux in the core at the intersection of the energized row and column operates and latches the associated contacts. Thereafter, the contacts remain magnetically latched until the next simultaneous occurrence of a long and a short pulse, when they release.

This invention relates to magnetically responding switch devices of a type suitable for telephone or similar switching networks. The devices of the type referred to are sometimes called "glass reed" switches. Generally they are controlled by current pulses fed through their energization circuits, and they have a memory function which is attained by magnetically latching the operated crosspoint members. Devices of this type are described in the Bell System Technical Journal, No. 1 of 1960, pages 1 to 30, and in U.S. Pat. Nos. 3,037,085, 3,005,876, 3,059,075 and 3,070,677, and elsewhere.

These devices have to meet the following two requirements to be used in coordinate switching arrays: (1) the magnetic circuit should have two energising circuits, one for each coordinate, and the magnetic operation should be such that the contact means are released when either of said circuits is energized, but not when both are energized at the same time; (2) the magnetic operation should be such that the contact means are operated when both of the circuits are energised. Assuming that such devices are arranged at the crosspoints of a coordinate array, the similar coils in the devices along each coordinate ($x$ or $y$) can be connected in series to form an energising circuit associated with that coordinate. Thus, the contact means are operated in the only device at the crossing of two energised coordinates ($x$ and $y$), while they are released in all other devices along those coordinates.

In the known switch devices of the type referred to, this operation is achieved by means of two pairs of coils symmetrically placed on two magnetically remnent members or cores. Each core carries a first coil of one pair and a second coil of the other pair. The two pairs of coils respectively are associated with the two coordinates in a coordinate array. More particularly, the two cores of these known devices are adapted to be magnetized so that their flux is either in opposition to each other or give a leakage flux which will operate the contact means, or in series with each other, to prevent such flux and thus to release the contact means.

Contact means having magnetic rod contacts (reed relays) are used in particular. In such known devices, the reversals of the magnetic induction in the cores are obtained by the use of energising coils of unequal magneto motive forces, namely one of these forces is double the other. When a coil having a magneto motive force NI is the only one energised on a core, it gives an induction in one direction. When this coil is energised together with the other coil, having an opposite force 2NI, the two coils together will give a resultant force of $2NI-NI=NI$, and a like induction, in the opposite direction.

This invention provides a switch device that will have a similar operation and provide some further advantages. According to a feature of this invention, a pair of coils of same magneto motive force are associated with each coordinate ($x$ or $y$). Each core carries a first coil of a pair and opposed thereto a second coil of the other pair. The control pulse means are adapted to supply a current pulse to the first coil, together with a longer current pulse to the second coil, in each pair of coils, or in both. When a switch device has both pairs of coils energised therein, i.e. when it is energised along the two coordinates ($x$ and $y$), the opposite coils on each core balance one another. Then, the shorter pulse ends and since the longer pulse persists in the second coil, a corresponding flux induction occurs in the core. Now, when the device has but one pair of coils energised therein, i.e. when it is energised along one coordinate only, the said first coil o fthat pair on one core will leave therein its opposite induction while the second coil of the pair will leave the same corresponding induction in the other core.

Thus, assuming that the second coils induce flux in the cores in opposition, the cores are magnetically in opposition when both pairs of coils are energised but they are magnetically in series when either pair of coils is energized alone, owing to a reversal of induction in the core which carries the first coil of that pair. The contact means are operated by the magnetic condition due to energisation along both coordinates, and they are released by the other magnetic condition due to energisation along either coordinate only. This operation is compatible with the known devices referred to. It will be understood that in those known devices, the second coil of either pair will impress its corresponding induction owing to its force being twice the force of the first coil of the other pair on the same core. Whereas, in the device according to this invention, the second coil will impress its induction owing to its acting alone as soon as the short pulse end and the effects caused by the longer pulse are no longer balanced by the first coil it is no longer balanced by the first coil of the other pair.

The remanent induction in the cores may be relatively strong, so as to operate or release the contact means. In such case, the control pulses can be shorter than the time period required for a mechanical switching responsive to a reversal of the induction in the cores. Otherwise, the remanent induction may be relatively weak and capable of holding the contact means only after a heavier induction has switched them during the pulse energisation. With such a weak inductance, the pulses must cover to switching time (namely, the shorter pulses, when one pair of coils is energised, must last long enough so that a first coil is energised alone on a core; and the longer pulses must last after the end of the shorter ones, when both pairs are energised, so that a second coil is first balanced by a first coil on either core). This invention is applicable to either of these two embodiments. However, the preferred form is where only a holding remanence is used, i.e. magnetic materials are used with a remanent induction which is fairly lighter than the saturation induction.

This invention further relates to coordinate arrays (or matrices) comprising the switch devices specified above. In such arrays, two energising circuits ($x'$ and $x''$, or $y'$ and $y''$) are associated with each coordinate ($x$ or $y$), and each of the two circuits comprises the similar coils in the switch devices along that coordinate. Thus, when four circuits are energised along two coordinates that define a crosspoint, the switch device operates at that crosspoint. The magnetic circuit switches the contact means into the operated position, and holds it switched by the remanent induction, while the magnetic circuits of all other devices along either of those two coordinates ($x$ and $y$) either release the associated contact means, or leave it in the released condition.

In the devices which are energised along one coordinate only the release, magnetic switching occurs at once when the two pulses are supplied to the two energising circuits associated with that coordinate, since there are then two coils energised in each device on the two respective cores associated with it. Since the coils are arranged to produce the same magnetic force, the inductions in both cores reach the same value even if this is not as high as the saturation induction. Then the cores keep the same remanent induction. In the device at the intersection of the energized coordinates, there is a crosspoint having two coils on each core which first balance one another, with no induction effect. Then, as the longer pulse persists, the second coil on each core acts alone, and again the inductions are the same in the two cores, even if they are not brought to the saturation value. Thus, in a coordinate array, the switch devices along the two coordinates of a crosspoint—but not the device right at that crosspoint—will release at once (or keep released), while the device at the crosspoint is operated a little later, i.e. after the end of the shorter pulses. Such an operation will be quite adequate in a switching network.

The fact that the said second coils have a dominant effect over the first ones due to their being energised by longer pulses eliminates the basic problem of synchronising the pulses in the coils, which is critical in the known devices where the energisation of the NI-coils should not last any longer than that of the 2NI-coils. Owing to this, the switch device according to this invention is applicable quite readily to networks that involve multiple connections: namely, to the twofold switching coordinate arrays, where an $x$-coordinate shall be connected to two $y$-coordinates. To make such as double connection, the pulses are supplied to the three coordinates, viz $x$, $y_1$ and $y_2$, and the switch devices are operated at the two crosspoints ($x$, $y_1$) and ($x$, $y_2$), and released elsewhere along those three coordinates. Such an application is a further feature of this invention.

An important advantage resulting from this double connection capability is that it now becomes possible to accomplish call logic in a much simpler manner. Thus, if it is necessary to simutlaneously connect a marker and a register to a calling line, it is easy to do so by operating two crosspoints simultaneously. When one of these circuits is no longer needed, its associated crosspoint may be released, and it may drop out of the connection. Likewise, when it becomes apparent that a new device is required, the connection may be transferred, as from a local intra office trunk to a distant office trunk, or from a called line to a call forward line.

Furthermore, from a structural viewpoint, the four coils can have the same number of turns (assuming that all pulses have the same current value). Thus, each core may carry a total winding which is double that required to give the wanted induction instead of three times that amount, volume, as is required in the known devices that use 2N-coils to act over the N-coils. The number of turns in the windings is reduced still further because owing to the fact, already mentioned, it is not necessary to raise the magnetic induction as high as the saturation value, particularly in the devices of the holding remanence type, as stated above.

The invention will now be described in detail with reference to the accompanying drawings, in which.

Figures 1, 2, 3, 6:
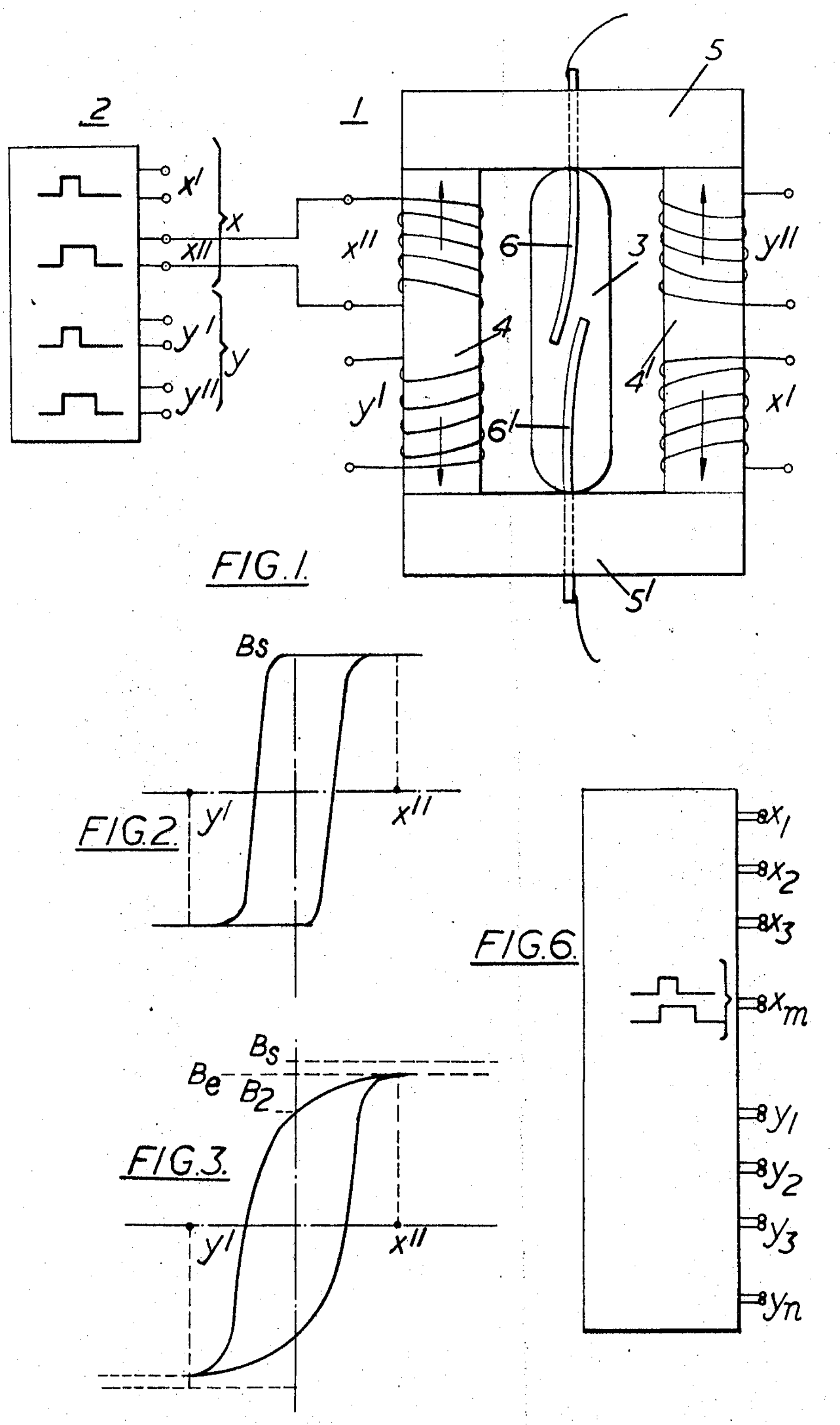
FIG. 1 is a schematic view of a switch device according to this invention.
FIG. 2 is a diagram showing the induction in a square-loop magnetic material.
FIG. 3 is a similar diagram for other magnetic material.
Figure 4:
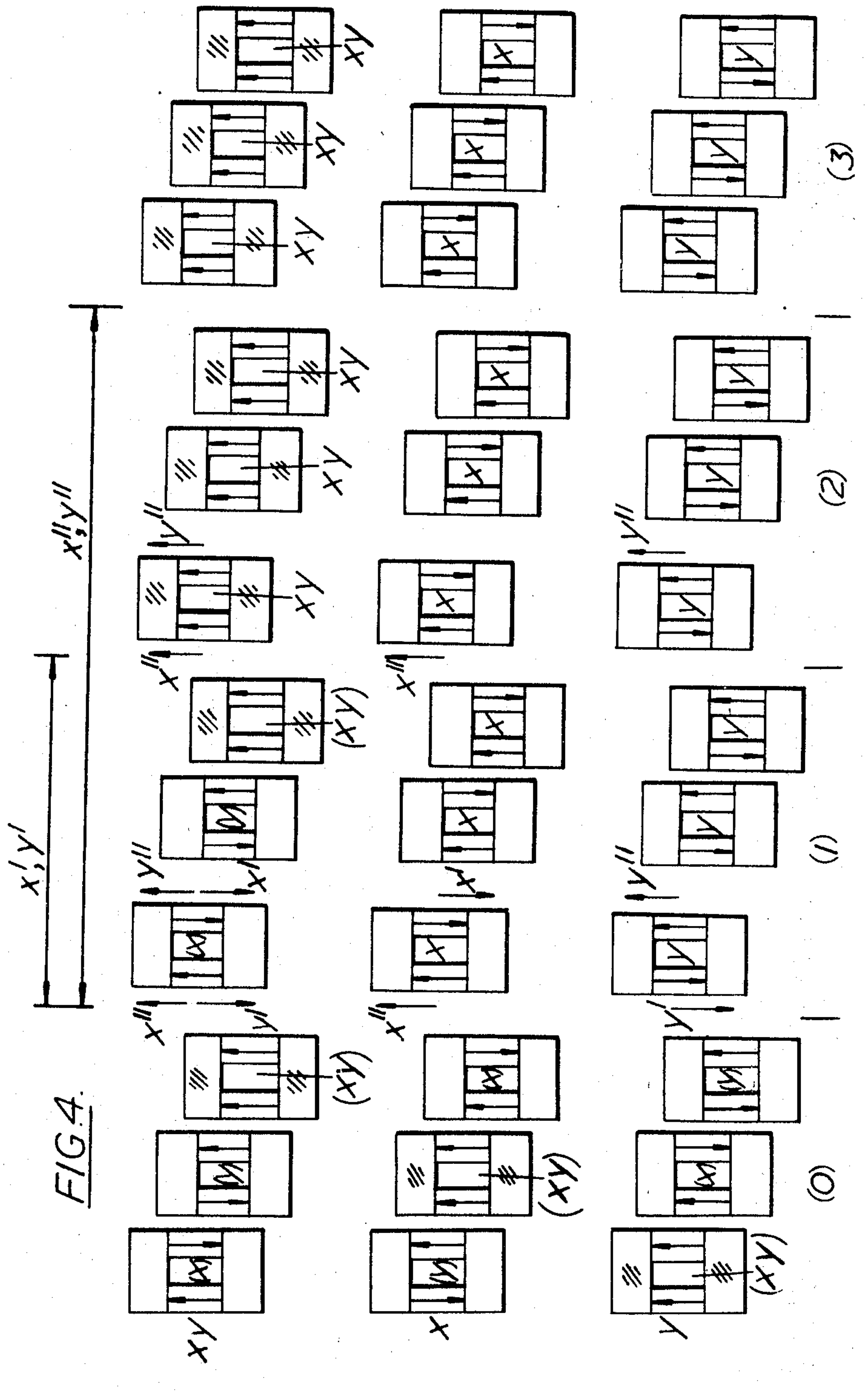
Figure 5:
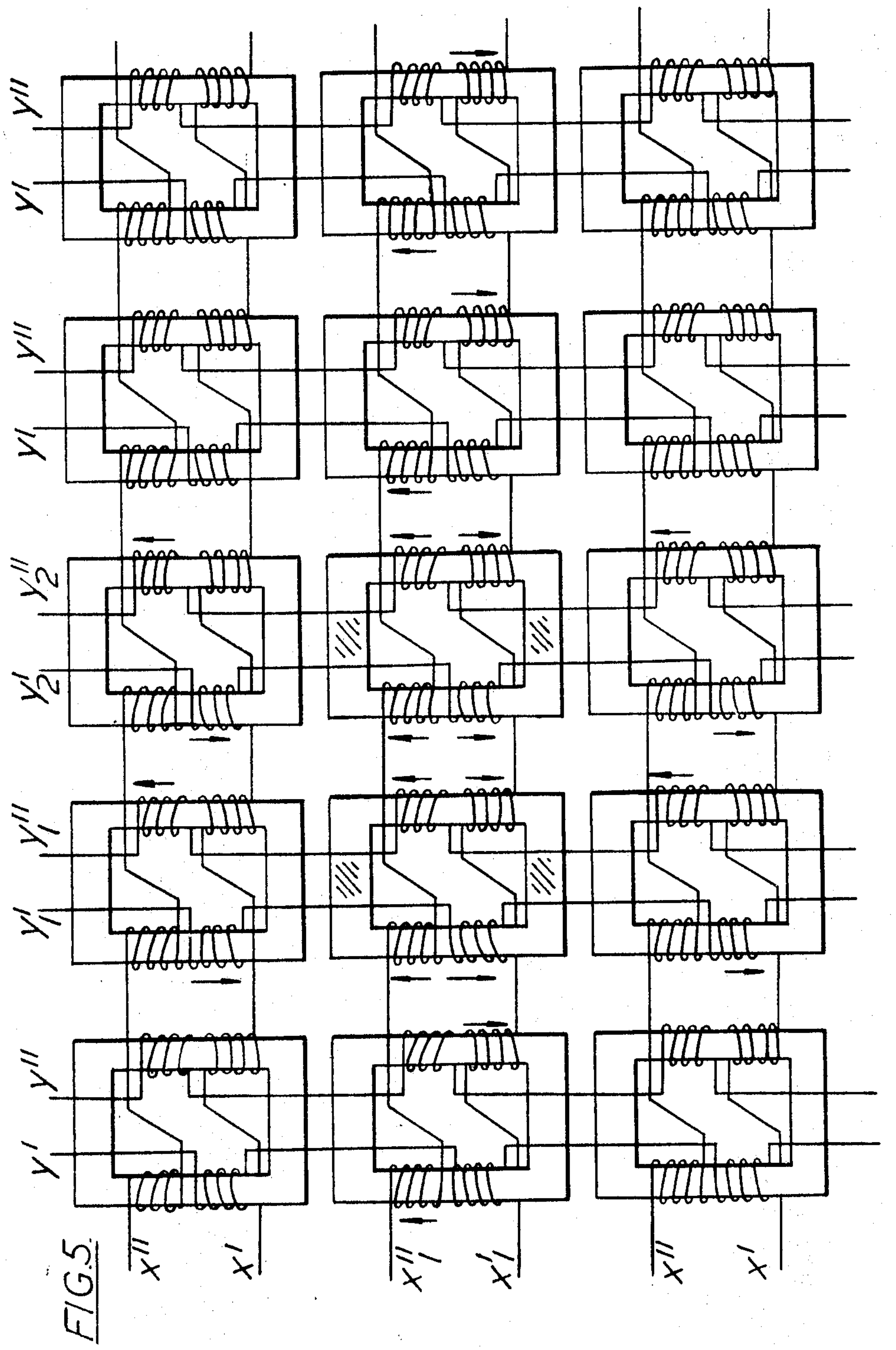

FIG. 4 graphically shows a magnetic circuit according to the invention, in its various conditions of energisation and remanence;

FIG. 5 shows the circuit of a coordinate array of switching devices according to the invention; and FIG. 6 shows schematically a pulse source adapted to supply pulses to the array of FIG. 5.

In FIG. 1, the crosspoint switch device comprises a magnetic circuit 1*a*, pulse supply means 2 adapted to energise a four-coil inductor device on said magnetic circuit, and magnetically controlled contact means 3 such as a reed contact sealed in a glass tube, as shown. The magnetic circuit 1 comprises two magnet cores 4, 4' which are completed by yokes 5, 5'. The four-coil inductor comprises coils $x''$ and $y'$ on core 4 and coils $x'$ and $y''$ on core 4'. All coils preferably have the same number of turns and produce the same magneto motive force when energized by pulses of the same current value. However, the two coils on each core work in opposition to each other so that one balances the other when both are energized, thus causing induction effect in the core.

The coils $x'$ and $x''$, each on a core form a pair of coils which are energized together when a coordinate $x$ is energized in a coordinate array. Likewise, the coils $y'$ and $y''$ form another pair which are energized together as a cordinate $y$. The two pair of coils are placed symmetrically on the cores. Thus, when coil $x''$ induces the flux in core 4 in a manner represented by an upward pointing arrow, as shown, coil $y''$ also induces a similar flux in core 4', again represented by an upward pointing arrow. The flux in core 4 is in opposition to the flux in core 4' in the magnetic circuit. Coil $x'$ on core 4' produces a flux which is opposed to the flux produced by coil $y''$. Thus, the flux from coil $x'$ induces core 4' as indicated by the downward pointing arrow, i.e. the two x coils are in series with the magnetic circuit. Coils $y'$ and $y''$ also induce flux in the cores which is in series, (i.e. core 4 downwards and core 4' upwards).

The contact reeds 6, 6' are made of soft magnetic material and are adapted to be operated by the stray flux from the magnetic circuit when the cores are magnetised in opposition. These reeds are released when the stray flux fades with the cores because they are serially magnetised in either direction.

The pulse supply means 2 simultaneously energizes the two coils in either pair, ($x'$, $x''$) or ($y'$, $y''$). However, the pulses supplied to coils $x''$, $y''$ last longer than the pulses supplied to coils $x'$, $y'$. Assuming that one pair, such as $x$, is energized, cores 4 and 4' are magnetically in series, thereby reversing the induction in either or both cores, as the case may be depending upon the initial condition of the cores. The contacts 6, 6' are opened at once, or kept open, as the case may be. Then, the short pulse in coil $x'$ stops, leaving the remanent flux in core 4'. The long pulse persist until, at last, the pulse in coil $x''$ stops leaving a remanent flux in core 4. The remanent flux holds the contact means in the released condition.

Assuming now that both pairs of coils are energised simultaneously, the two coils on each core first balance one another with the initial induction. Then the longer pulses act along in coils $x''$ and $y''$ on cores 4 and 4', and the cores are induced in opposition, reversing the induction in one core from the initial induction in the cores. Contacts 6, 6' are closed, or remain closed. At last, the long pulse in coils $x''$, $y''$ will stop in turn, leaving the remanent induction in the cores. This will hold the contact means operated.

It will be understood, therefore, that when two crosspoints are energized at once and one is being released while the other is being operated, the one will release at once, and the other will operate a little later, when the shorter pulse stops. This feature fits the wanted operation in a switching network.

The cores may be made of square-loop magnetic material, having a square loop hysteresis loop characteristic as shown in FIG. 2, for core 4. When the $x$ pair of coils are energised, coil $x''$ swings the induction upwards to the value $B_s$ (or leaves it unchanged if the core magnetised upwards initially). When the $y$ pair is energised, coil $y'$ swings the induction downwards to the same value (or leave it unchanged). When both pairs are energised together, coils $x''$ and $y'$ will first balance one another to give a zero field, leaving the induction unchanged from, whatever it was initially. The coil $x''$ remains energized alone after the short pulse stops and swings the induction upwards (or leave it unchanged, if initially upward).

Since there is but one induction value in either direction, the remanent condition is able to operate the contact means, so that the pulses can be made shorter than the switching time of the contact means, provided that they cause the wanted magnetic reversals.

In practice, however, the cores might well be made of some other magnetic material, having a round hysteresis loop as shown in FIG. 3. There will be three induction values: $B_s$ for the saturated condition, $B_e$ for the energised condition, with fields from $x''$ or $y'$ substantially smaller than that required to reach the saturated condition, and $B_r$ for the remanent condition. The remanent induction $B_r$ may be able to operate the contact means, which would allow the use of very short pulses, as said above. Preferably however, only the energised induction $B_e$ is able to operate the switch, and only a holding force is required of the lower remanent induction $B_r$. The pulses will have to last long enough to cover the switching time in the contact means.

In FIG. 4, the first row shows the conditions of a magnetic circuit such as that of FIG. 1. These are crosspoints which are energized along the two coordinates $x$, $y$ (i.e. both pairs of coils energised). The two other rows show the conditions of the magnetic circuit which are energised only on coordinate $x$, or coordinate $y$ (coils $x'$, $x''$, or coils $y'$, $y''$), respectively. In each row, there are four groups of core symbols which respectively represent the conditions (0) before energisation (initial condition), (1) in the first step of energisation, when the shorter pulses are supplied simultaneously with the longer ones, (2) in the second step of energisation, when the longer pulses is supplied alone, and (3) after the end of the longer pulses. In each group, there are three magnetic circuits according to their initial conditions, which may be (1) a serial remanence in one direction (2) a serial remanence in the other direction, and (3) an opposition remanence in the cores. In each group of a row, the three conditions refer respectively to those of the first group, initial condition, as shown. The arrows outside the cores show 32 magnetic fields resulting from an energization of the coils $x'$, $x''$, $y'$, $y''$. The arrows inside the cores show the direction of induction therein. The shadowed yokes show the leakage flux from oppositely induced cores. The horizontal arrows at the top of FIG. 4 indicate that pulses $x''$, $y''$ last longer than pulses $x'$, $y'$.

FIG. 5 shows the magnetic and electrical circuits in a coordinate array of switch devices similar to that of FIG. 1. The coils referenced by the character coordinate $x$) are connected in series to form two energising circuits $x'$, $x''$ associated with those rows. The other coils referenced $y$ (coordinate $y$) are also connected in series to form two energising circuits $y'$, $y''$ associated with these columns. It is assumed in this drawing that row $x_1$ (circuits $x'_1$ and $x''_1$) and columns $y_1$ (circuits $y'_1$ and $y''_1$) and $y_2$ (circuits $y'_2$ and $y''_2$) are energised and in the first operating step (both coils are energised in each pair $x'$, $x''$ or $y'$, $y''$). The arrows show orientation of the flux the fields from the coils. However, the shadowed spots show the leakage fluxes that will be caused in the second step by the long-pulse coils then acting along, and later by the remanent magnetisation, in the two devices at the crossings $x_1, y_1$ and $x_1, y_2$.

FIG. 6 shows schematically a pulse supply device adapted to supply the energisation circuits of FIG. 5. There is an output for each $x$ coordinate ($x_1$, $x_2$, to $x_m$) and for each $y$ coordinate ($y_1$, $y_2$, to $y_n$). Of course, the outputs are controlled by suitable coordinate selection means, as is usual in the art. Each output comprises the two circuits, one of them supplying a shorter pulse and the other, a longer one, as shown at the output $x_m$. One $x$ and one $y$ will be energized together in a conventional switching matrix, and one $x$ and two $y$ in a twofold switching matrix, like in FIG. 5.

It will be understood that this description is here made in an explanatory purpose, referring to particular embodiments which shall not limit the scope of the invention. In particular, this scope should cover any modifications in the arrangement and operation of the magnetic circuit controlled by shorter and longer pulses, as described above.

We claim:

1. A magnetic crosspoint switching device comprising two cores each having two magnetically opposed windings thereon, each of said windings providing a substantially equal magneto motive force on its associated core, said windings being arranged so that each of said cores carries one winding of each of two pairs of windings, contact means associated with said cores for releasing responsive to a simultaneous energization of all of said windings, and operating responsive to the simultaneous energization of a single winding in each pair of said windings, and means for substantially simultaneously applying a short pulse to one winding in each pair of said windings and a long pulse to the other winding in each pair of said windings.

2. The device of claim 1 wherein a plurality of said crosspoints are arranged in a coordinate array, a first of said pairs of windings being extended to define rows in said array and a second of said pairs of windings being extended to define columns in said array, the electromotive forces produced on said cores by energizations of said windings being such that said long short pulses on two selected intersecting coordinates of a column and a row operate contacts at the crosspoint where said selected coordinates intersect and release all other crosspoints on each of said selected coordinates.

(3) The device of claim 2 wherein the electromotive forces produced on said cores are such that contacts at a plurality of crosspoints may be operated by simultaneously energizing a coordinate in one direction and a plurality of coordinates in another direction.

4. The device of claim 6 and means for thereafter transferring existing connections by reapplying said pulses to release an operated set of contacts and operate another set of contacts.

5. A switching network comprising a coordinate array of glass reed switches, means for operating said switches in a two cycle operation responsive to a coincident energization of vertical and horizontal multiples, by pulses of different lengths, said two cycle operation comprising the first cycle of releasing all operated contacts in each of said energized vertical and horizontal multiples and then the second cycle of operating the contacts at the intersection of the energized multiples during longer ones of said pulses, and means effective during the operation of the contacts at the intersection for magnetically latching said operated crosspoint.

6. The network of claim 5 and means for simultaneously energizing a multiple in one of said coordinates and a plurality of multiples in the other of said coordinates to complete multiple connections at a plurality of said intersections.

7. The network of claim 5 and means for thereafter transferring connections by simultaneously energizing one of the originally energized coordinate multiples and at least one other intersecting coordinates, whereby the magnetically latched crosspoint releases during the first cycle in said two cycle operation and another crosspoint latches at the intersection of said one and said other coordinates.

References Cited

UNITED STATES PATENTS

| | | | |
|---|---|---|---|
| 2,995,637 | 8/1961 | Feiner et al. | 335—182 XR |
| 3,183,487 | 5/1965 | Deeg | 340—166 |
| 2,889,540 | 6/1959 | Bauer et al. | 340—166 XR |
| 3,134,908 | 5/1964 | Ellwood | 317—155.5 XR |
| 3,206,649 | 9/1965 | Feiner | 317—137 |

DONALD J. YUSKO, Primary Examiner

U.S. Cl. X.R.

317—155.5